(No Model.)
J. D. DREESE.
FISH SPEAR.
No. 515,875.  Patented Mar. 6, 1894.
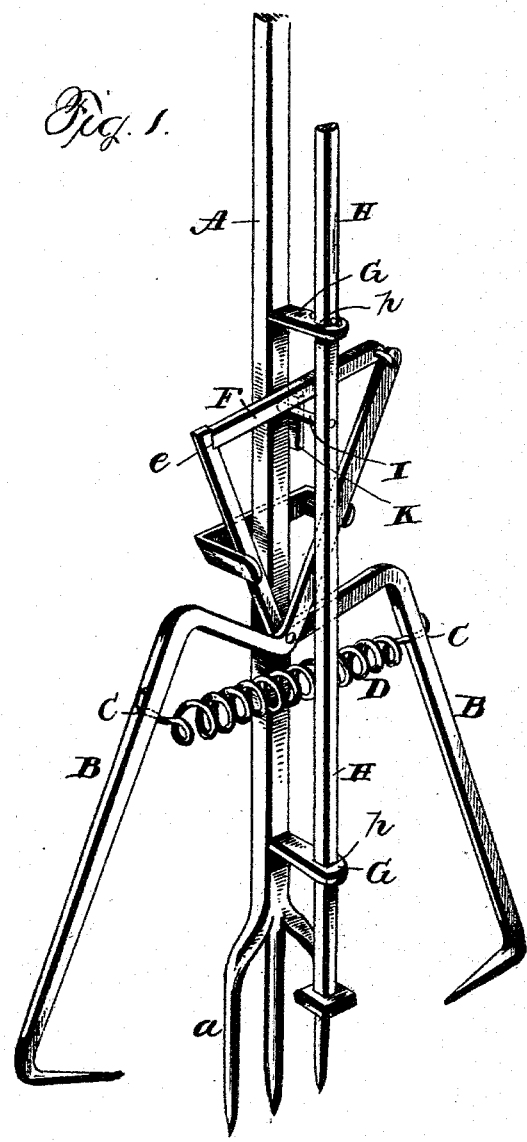
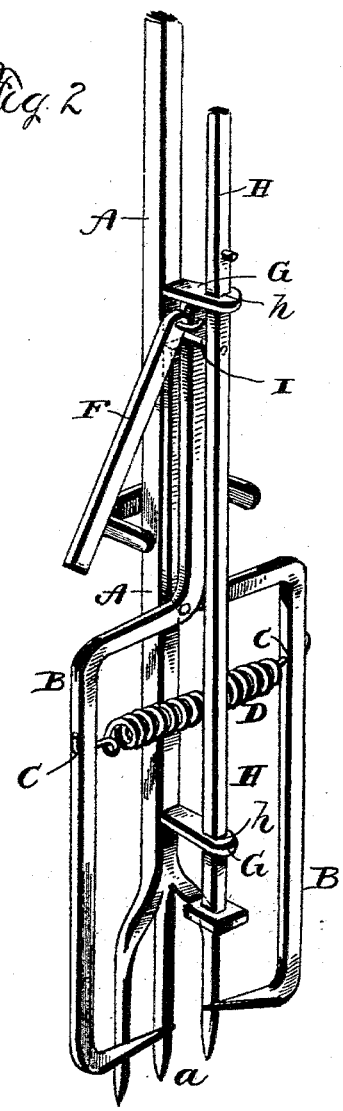
Witnesses
C. J. Williamson
A. L. Hough
Inventor
John D. Dreese,
by Franklin H. Hough
His Atty.

UNITED STATES PATENT OFFICE.

JOHN D. DREESE, OF HALSTEAD, KANSAS.

FISH-SPEAR.

SPECIFICATION forming part of Letters Patent No. 515,875, dated March 6, 1894.

Application filed November 10, 1893. Serial No. 490,541. (No model.)

*To all whom it may concern:*

Be it known that I, JOHN D. DREESE, a citizen of the United States, residing at Halstead, in the county of Harvey and State of Kansas, have invented certain new and useful Improvements in Fish-Spears; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to certain new and useful improvements in spears for catching fish, and my object being to provide an article of this nature which shall be simple in construction, of durability, and one which will not mutilate the flesh of a fish when speared, any more than is absolutely necessary, as in my invention I dispense entirely with barbs, commonly used on spears which necessarily tear the fish when the spear is extracted from the flesh. By the provision of side spring actuated hooks in connection with my invention, I make the catch more sure.

My invention consists further in the novel construction, combination and adaptation of the parts as will be hereinafter more fully described and then specifically defined in the appended claims.

I clearly illustrate my invention in the annexed drawings forming a part of this specification, in which drawings, like letters of reference indicate like parts throughout both views, and in which—

Figure 1, represents a perspective view of my spear as set or distended ready for use. Fig. 2 is a similar view closed.

Reference now being had to the details of the drawings by letter, A, represents the stem of the spear, having the prongs a, and at any convenient part of the said stem, are pivoted, on a common pivot, the side engaging arms or hooks B, having the inwardly bent points sharpened. The said arms below their pivotal points are bent outwardly, and at the points C, is secured a coil spring D, which is adapted to hold the points of the hook engaging arms, normally, together. At the end of one of the free ends of the arms B, is pivoted the lever F, which is provided to hold the spear set, or hold the arms B distended against the tension of the coiled spring D, the said lever F, resting its free end in a notch e at the end of a second arm.

At points G, G, are supports having a trip rod H, passing through eyes h, and I, is a lug secured to the trip rod which is adapted to bear against the lever F, to spring the arms B, when the said trip lever is forced against the speared fish or animal. The lug I, serves also a secondary purpose in connection with the stop K, to prevent the free upper ends of the arms B passing beyond the center of the stem, when arms are sprung shut.

The simplicity and the operation of my invention will be readily seen, as when the spear is set, with arms distended, the tines are forced through the fish, the end of the trip lever coming in contact with the back of the fish, releases the lever F, by means of the lug I, and the sharp points of arms are forced into the flesh of the fish, thus securely holding the same without the use of barbs.

Having thus described my invention, what I claim to be new, and desire to secure by Letters Patent, is—

1. In a fish spear, the combination of a pronged spear having pivoted to its stem spring actuated hooked arms, of a lever pivoted to an upper free end of one arm, and adapted to engage the opposite arm and hold said arms distended against the tension on a spring secured to said arms, of a trip lever working in bearings on the stem of the spear, and carrying a lug for releasing the locking lever F, substantially as shown and described.

2. In a spear, the combination of the main shaft with pronged head, hooked arms pivoted to the shaft, a locking lever F, pivoted in the upper end of one arm, adapted to rest in the notch at the end of the second arm, of a trip lever working in bearings on the main shaft, and carrying a lug I serving the double purpose of releasing the lever F, and serving as a stop for the upper free ends of the spring actuated arms B, all substantially as shown and described.

In testimony whereof I affix my signature in presence of two witnesses.

JOHN D. DREESE.

Witnesses:
J. LINN,
D. W. THOMPSON.